(12) United States Patent
Helfrich et al.

(10) Patent No.: US 12,366,463 B2
(45) Date of Patent: Jul. 22, 2025

(54) METHOD FOR CONTROLLING A DRIVING OPERATION OF AN AUTONOMOUSLY CONTROLLED VEHICLE

(71) Applicant: Volvo Autonomous Solutions AB, Gothenburg (SE)

(72) Inventors: Thorsten Helfrich, Gothenburg (SE); Mats Jonasson, Partille (SE); Kristoffer Tagesson, Hammarö (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 27 days.

(21) Appl. No.: 18/253,523

(22) PCT Filed: Nov. 25, 2020

(86) PCT No.: PCT/EP2020/083402
§ 371 (c)(1),
(2) Date: May 18, 2023

(87) PCT Pub. No.: WO2022/111803
PCT Pub. Date: Jun. 2, 2022

(65) Prior Publication Data
US 2024/0011797 A1    Jan. 11, 2024

(51) Int. Cl.
*G01C 25/00* (2006.01)
*B60W 50/00* (2006.01)
(Continued)

(52) U.S. Cl.
CPC ......... *G01C 25/005* (2013.01); *B60W 50/035* (2013.01); *B60W 50/06* (2013.01);
(Continued)

(58) Field of Classification Search
CPC ........ G01C 25/005; B60W 2050/0083; B60W 2556/50; B60W 2520/14
See application file for complete search history.

(56) References Cited

U.S. PATENT DOCUMENTS 9,254,822 B1    2/2016  Friend et al.
2002/0173910 A1  11/2002  McCall et al.
(Continued)

FOREIGN PATENT DOCUMENTS

WO    2019125268 A1    6/2019

OTHER PUBLICATIONS

International Search Report and Written Opinion in corresponding International Application No. PCT/EP2020/083402 mailed Aug. 17, 2021 (17 pages).
(Continued)

*Primary Examiner* — Jelani A Smith
*Assistant Examiner* — Toya Pettiegrew
(74) *Attorney, Agent, or Firm* — Venable LLP; Jeffri A. Kaminski

(57) ABSTRACT

The present disclosure relates to method for controlling a driving operation of an autonomously controlled vehicle. In particular, a navigation system is controlled to autonomously operate the vehicle in a direction from a position of loss of location to a first upcoming stop position; and to controlling the vehicle to a stand-still operation when the vehicle arrives at the stop position for calibration of a sensor arranged to measure an angular velocity of the vehicle.

15 Claims, 3 Drawing Sheets

(51) Int. Cl.
  *B60W 50/035* (2012.01)
  *B60W 50/06* (2006.01)
  *B60W 60/00* (2020.01)

(52) U.S. Cl.
  CPC . *B60W 60/0015* (2020.02); *B60W 2050/0083* (2013.01); *B60W 2420/408* (2024.01); *B60W 2520/00* (2013.01); *B60W 2556/50* (2020.02)

(56) References Cited

U.S. PATENT DOCUMENTS

| | | |
|---|---|---|
| 2003/0036847 A1 | 2/2003 | Geier et al. |
| 2013/0160543 A1 | 6/2013 | Kontz et al. |
| 2014/0297177 A1 | 10/2014 | den Otter |
| 2015/0012172 A1* | 1/2015 | Hegemann ............ G01S 13/862 |
| | | 701/33.1 |
| 2018/0224851 A1 | 8/2018 | Park |
| 2018/0229738 A1 | 8/2018 | Nilsson et al. |
| 2019/0012913 A1 | 1/2019 | She et al. |
| 2019/0204425 A1* | 7/2019 | Abari ...................... G01S 7/497 |
| 2019/0210612 A1* | 7/2019 | VanLandingham .... B60K 28/10 |
| 2019/0359188 A1 | 11/2019 | Yamada et al. |
| 2020/0033131 A1 | 1/2020 | Reid et al. |
| 2020/0074848 A1 | 3/2020 | Namba |
| 2020/0086837 A1 | 3/2020 | Le Cornec |
| 2020/0166344 A1 | 5/2020 | Knutson et al. |
| 2020/0233420 A1* | 7/2020 | Liu ....................... G05D 1/0214 |
| 2020/0339151 A1* | 10/2020 | Batts ................... B60W 60/001 |
| 2021/0026366 A1 | 1/2021 | Horesh |
| 2021/0215485 A1* | 7/2021 | Ishigami ................. G01S 19/52 |

OTHER PUBLICATIONS

International Search Report and Written Opinion in corresponding International Application No. PCT/EP2020/083391 mailed Aug. 25, 2021 (16 pages).

Non Final Office Action dated Apr. 22, 2025 in corresponding U.S. Appl. No. 18/253,511, 19 pages.

* cited by examiner

METHOD FOR CONTROLLING A DRIVING OPERATION OF AN AUTONOMOUSLY CONTROLLED VEHICLE

CROSS-REFERENCE TO RELATED APPLICATIONS

This application is a U.S. National Stage application of PCT/EP2020/083402, filed Nov. 25, 2020 and published on Jun. 2, 2022 as WO 2022/111803, all of which is hereby incorporated by reference in its entirety.

TECHNICAL FIELD

The present disclosure relates to a method for controlling a driving operation of an autonomously controlled vehicle. The present disclosure also relates to a control system and an autonomously controlled vehicle comprising such a control system. Although the method will mainly be described in relation to a heavy-duty vehicle, i.e. a truck, it may also be applicable for other types of autonomously controlled vehicles, such as preferably working machines arranged at a confined area.

BACKGROUND

In the field of autonomously controlled vehicles, such as autonomously controlled heavy vehicles, i.e. trucks and working machines, there is a continuous development with regards to safety. In particular, as the vehicles are operated without substantial interference of an operator, it is important that the navigation system of such vehicle function sufficiently to be able to guide the vehicle to its end destination.

Autonomous vehicles rely on numerous types of sensors, or similar arrangements, to localize the vehicle with regards to the environment and traffic situation. According to an example prior technology, US 2002/173910 relates to a vehicle self-carried positioning system. The positioning system can obtain positioning measurements and exchange the vehicle positioning information with other vehicles.

However, the system in US 2002/173910 is still in need of further improvements. In particular, there is a desire to be able to sufficiently operate the vehicle in cases when the positioning system loses location, i.e. when the system is unable to sufficiently locate the vehicle on the road it is operating.

SUMMARY

It is an object of the present disclosure to describe a method which at least partially overcomes the above described deficiencies. This is achieved by a method according to claim 1.

According to a first aspect, there is provided a method for controlling a driving operation of an autonomously controlled vehicle, the vehicle comprising a sensor arranged to measure an angular velocity of the vehicle in at least one direction during operation, the method comprising: obtaining a signal indicative of a road path to an end destination for operation of the vehicle; generating a plurality of stop positions along the road path; and when determining a loss of location of the vehicle: determining a position along the road path at the loss of vehicle location; controlling a navigation system of the vehicle, using angular velocity data from the sensor, to autonomously operate the vehicle in a direction from the position of loss of location to a first upcoming stop position of the plurality of stop positions; and controlling the vehicle to a stand-still operation when the vehicle arrives at the stop position for calibration of the sensor.

The wording "stop positions" should be construed as positions along the road at which the vehicle is able to properly stop to a stand-still. These stop positions could be, for example, a sufficiently large shoulder of the road, an intersection, or T-intersection, at which the vehicle should stop to give way for vehicles crossing the road, a position at a traffic light, or merely suitable stop positions along the road. The latter alternative is particular useful for vehicle operated within a confined area. Accordingly, when obtaining the road path to follow, the plurality of stop positions is determined.

Moreover, the loss of location should be construed such that the navigation system is unable to determine the current position of the vehicle. Hence, when a loss of location of the vehicle is determined, the navigation system does no longer receive position data from e.g. a GPS otherwise continuously providing information of the location of the vehicle. The signal indicative of the road path to the end destination is thus preferably received from such positioning system prior to the loss of location.

An advantage is that the navigation is controlled based on data from the sensor, and the sensor can be calibrated at sufficient intervals, and thus be able to continue to functionally operate the vehicle towards the end destination. As calibration of the sensor is made at the predetermined intervals, a well-functioning fallback system is provided. Also, by generating the stop positions beforehand, it can be assured that the vehicle will stop for calibration of the sensor at safe stop positions, i.e. where there is a minimal risk of vehicle accidents.

The present disclosure can preferably be executed for vehicles operating at a confined area, where the surrounding traffic and traffic situation is controlled. However, the present disclosure is also equally applicable for vehicles operated at "uncontrolled" traffic situations, i.e. at public roads, etc.

According to an example embodiment, the method may further comprise controlling the navigation system to autonomously operate the vehicle to the remaining stop positions; and controlling the vehicle to the stand-still operation at each of the stop positions for calibration of the sensor.

As indicated above, the sensor of the vehicle is hereby continuously calibrated during operation towards the end destination.

According to an example embodiment, the method may further comprise controlling the vehicle to the stand-still operation for calibration of the sensor when determining the loss of location.

A stand-still operation should be construed such that the vehicle is standing still, i.e. the vehicle velocity is zero, whereby calibration of the sensor can be performed. By controlling the vehicle to the stand-still operation as soon as a loss of location is determined, it is assured that the sensor is sufficiently calibrated before controlling the vehicle towards the first stop position.

According to an example embodiment, the method may further comprise obtaining a signal indicative of an angular velocity of the sensor, and controlling the vehicle to an intermediate stand-still operation when the angular velocity exceeds a predetermined threshold limit.

Hereby, if the sensor is indicating a too severe "drifting", the vehicle can be controlled to an emergency stop for calibration. Hence, if the angular velocity of the sensor exceeds the predetermined threshold limit, this is an indication that the sensor is not guiding the vehicle properly and needs to be calibrated. The vehicle may also be controlled to be arranged in the intermediate stand-still operation when an accumulated angle over a predetermined time period exceeds a maximum allowable accumulated angle.

According to an example embodiment, the number of plurality of stop positions may be dependent on the length of the road path to the end destination. Hereby, a sufficient distribution of the calibration positions is executed, whereby the number of calibration positions is determined based on the specific vehicle application. Hence, when operating the vehicle at a public road, the stop positions should preferably be arranged closer to each other compared to operation at a confined area.

According to an example embodiment, calibration of the sensor may comprise obtaining a signal indicative of a value of the angular velocity of the sensor when the vehicle is arranged in the stand-still operation; setting the value as an offset angular velocity; and calibrating the sensor by subtracting the offset angular velocity from the obtained angular velocity value.

When the vehicle is arranged in the stand-still operation, it can be assumed that the angular velocity should be zero. Thus, a signal indicating an angular velocity when the vehicle is standing still is determined as an offset angular velocity.

According to an example embodiment, the navigation system may be arranged in a limp-home mode when determining the loss of location of the vehicle.

Operating the vehicle in the limp-home mode should be construed such that the vehicle is preferably driving with a reduced vehicle speed, lower acceleration and deceleration, etc. in comparison to a "normal driving operation". The limp home mode thus enables the vehicle to operate towards the end destination even if various functionalities of the vehicle is not functioning properly.

According to an example embodiment, the position along the road path at the loss of vehicle location may be received from a positioning system of the vehicle. Hence, the positioning system transmits a signal indicating the "last known" position before losing the location. This presents a good starting position for operation towards the first stop position.

According to an example embodiment, the positioning system may be at least one of a GPS, a GNSS or a LIDAR system.

According to an example embodiment, the navigation system may be configured to receive the road path to the end destination comprising the plurality of stop positions in the form of offline available data prior to vehicle departure. An advantage is that the stop positions are available to the navigation system irrespective of a connection to a positioning system, etc.

According to an example embodiment, sensor data from the sensor may be used in the navigation system of the vehicle, to autonomously operate the vehicle in a direction from the position of loss of location to an upcoming stop position.

According to an example embodiment, the sensor may be a yaw rate sensor configured to measure a yaw angular velocity during vehicle operation. As an alternative, and according to an example embodiment, the sensor may be a wheel speed sensor configured to measure a wheel angular velocity during vehicle operation.

Hereby, the yaw angular velocity or wheel angular velocity is used by the navigation system of the vehicle, to autonomously operate the vehicle in a direction from the position of loss of location to an upcoming stop position. The navigation system may hereby be operated to the navigate the vehicle to the stop positions, as part of a so-called dead reckoning algorithm.

According to an example embodiment, the method may further comprise obtaining a verification signal indicative of a completed sensor calibration; and controlling the navigation system of the vehicle to autonomously operate the vehicle in a direction towards an upcoming stop position. An advantage is that it can be assured that the sensor is sufficiently calibrated and function properly before the vehicle is operated towards the next coming stop position.

According to a second aspect, there is provided a control system for autonomously controlling a vehicle, the control system being connectable to a navigation system and to a sensor arranged to measure an angular velocity of the vehicle in at least one direction during operation, wherein the control system is configured to obtain a signal indicative of a road path to an end destination for operation of the vehicle; generate a plurality of stop positions along the road path; and when the control system determines a loss of location of the vehicle; determine a position along the road path at the loss of vehicle location; transmit a navigation signal to the navigation system of the vehicle, the navigation signal being arranged to, when executed by the navigation system, cause the navigation system to autonomously operate the vehicle in a direction from the position of loss of location to a first upcoming stop position of the plurality of stop positions and to arrange the vehicle in a stand-still operation when the vehicle arrives at the stop position; and transmit a calibration signal to the sensor, the calibration signal being arranged to, when executed by the sensor, calibrate the sensor when the vehicle is arranged in the stand-still operation.

Effects and features of the second aspect are largely analogous to those described above in relation to the first aspect.

According to a third aspect, there is provided an autonomously controlled vehicle, comprising a navigation system, a sensor arranged to measure an angular velocity of the vehicle in at least one direction during operation, and a control system according to the above described second aspect, wherein the control system is connected to the navigation system and the sensor for communication of control signals therebetween.

According to a fourth aspect, there is provided a computer program comprising program code means for performing the steps of any one of the embodiments described above in relation to the first aspect when the program is run on a computer.

According to a fifth aspect, there is provided a computer readable medium carrying a computer program comprising program means for performing the steps of any one of the embodiments described above in relation to the first aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
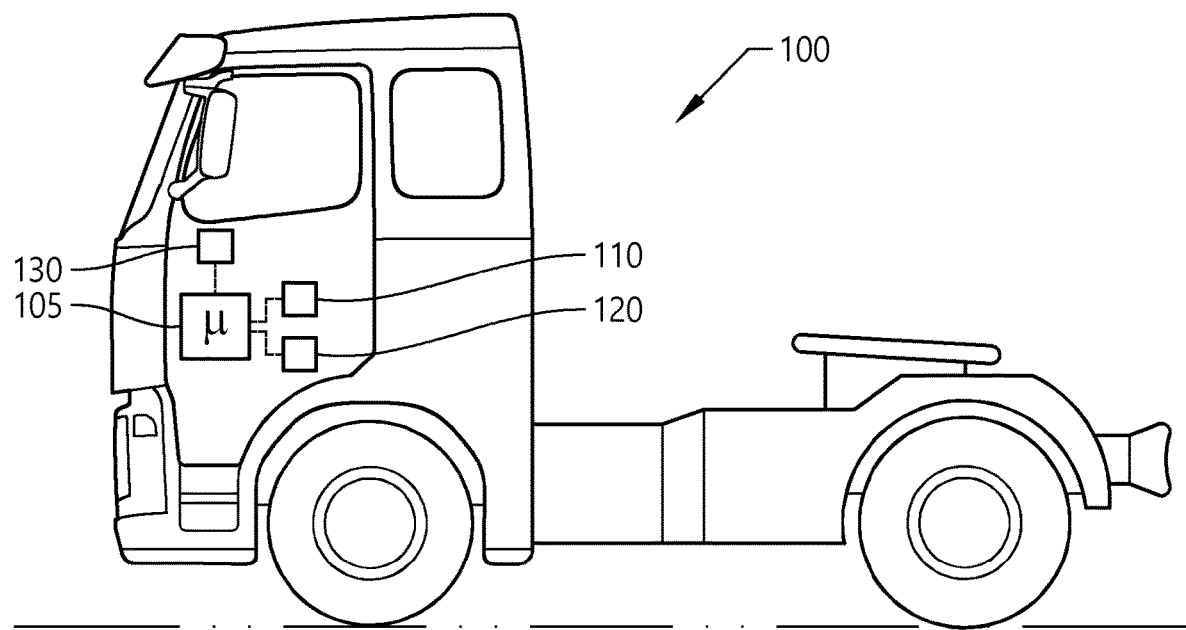
FIG. 1 is a lateral side view illustrating a vehicle suitably comprising a control system according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 100 in the form of a truck. The vehicle 100 comprises a control system 105, a navigation system 110 and a positioning system 130, as well as a sensor 120 arranged to measure an angular velocity of the vehicle. It should be readily understood that the control system 105, the navigation system 110, the positioning system 130 and the sensor 120 are merely schematically illustrated in FIG. 1. In particular, the sensor 120 for measuring the angular velocity may be positioned, for example, in the vicinity of the wheels of the vehicle, or at other suitable position for fulfilling its purpose to, as correct as possible, measure and determine a current angular velocity of the vehicle. The sensor may be at least one of a yaw rate sensor configured to measure a yaw angular velocity during vehicle operation, or a wheel speed sensor configured to measure a wheel angular velocity during vehicle operation.

The control system 105 may include a microprocessor, microcontroller, programmable digital signal processor or another programmable device. The control system 105 may also, or instead, include an application specific integrated circuit, a programmable gate array or programmable array logic, a programmable logic device, or a digital signal processor. Where the control system 105 includes a programmable device such as the microprocessor, microcontroller or programmable digital signal processor mentioned above, the processor may further include computer executable code that controls operation of the programmable device.

The positioning system 130 is arranged to receive signals indicative of the vehicle's position along a road path. The positioning system 130 may, for example, be a Global Positioning System (GPS), a Global Navigation Satellite System (GNSS) or a LIDAR system. The following will refer the positioning system 130 in relation to a GPS.

The vehicle depicted in FIG. 1 is an autonomously controlled vehicle. However, autonomously controlled should be understood such that the vehicle is configured to also be controllable by an operator driving the vehicle, or remotely controlled from e.g. a centralized control tower, etc. An operator may thus, if needed, intervene and take control of steering and propulsion of the vehicle.

Figure 2:
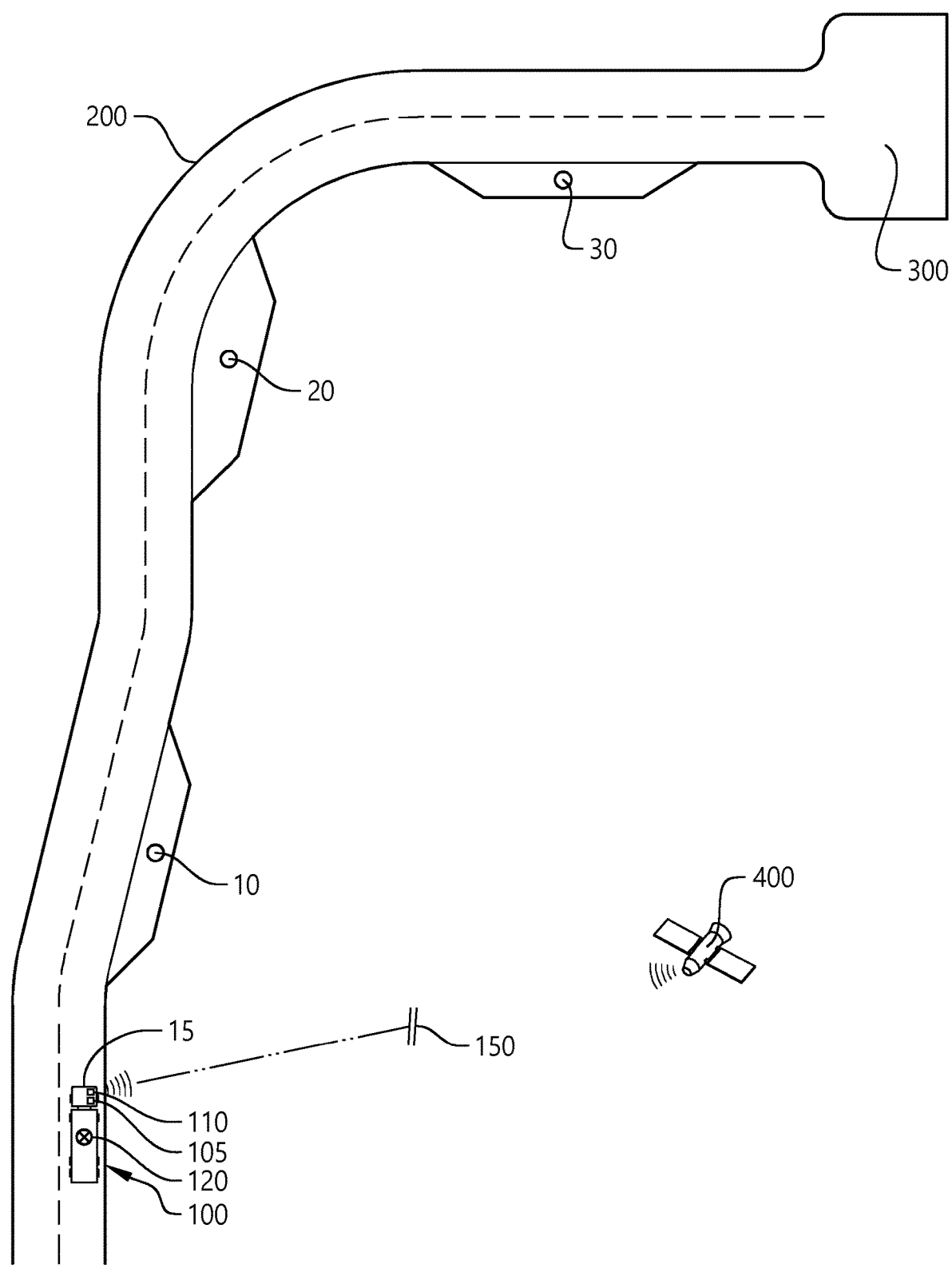
FIG. 2 is a schematic illustration of a vehicle operated by means of angular velocity data from a sensor after loss of vehicle location according to an example embodiment.

In order to further describe operation of the vehicle 100, reference is made to FIG. 2, which is a schematic illustration of a vehicle operated by means of angular velocity data from a sensor after loss of vehicle location according to an example embodiment. As can be seen, the vehicle is operated and driving along a road path 200. The vehicle 100 is heading towards an end destination 300. The road path 200 and end destination 300 could form part of a confined area, or form part of a public road.

The vehicle 100 is operated by means of receiving map data from a satellite 400, i.e. the GPS 130 continuously receives data indicative of the road path 200 and the current position of the vehicle on the road. The map data is transmitted to the control system 105 whereby the vehicle is able to be autonomously controlled towards the end destination 300. During operation, the control system 105 generates a plurality of stop positions 10, 20, 30 along the road path 200. The plurality of stop positions 10, 20, 30 may be generated from the current position of the vehicle along the road and up to the end destination 300. The control system 105 thus preferably continuously updates the potential stop positions during operation such that updated data relating to the road ahead is available in a scenario of loss of location as will be described in detail below. As an alternative, the control system 105, and in particular the navigation system 110 may receive data indicative of the road path 200 and the plurality of stop positions 10, 20, 30 in the form of offline available data, which is received prior to vehicle departure.

The stop positions are positions along the road at which it is appropriate to stop the vehicle 100 with a reduced risk of accidents. The stop positions 10, 20, 30 are indicated in FIG. 2 as an increased width of the shoulder of the road. A stop position may also be e.g. a road intersection, a T-intersection, a traffic signal position, etc.

Figure 3:
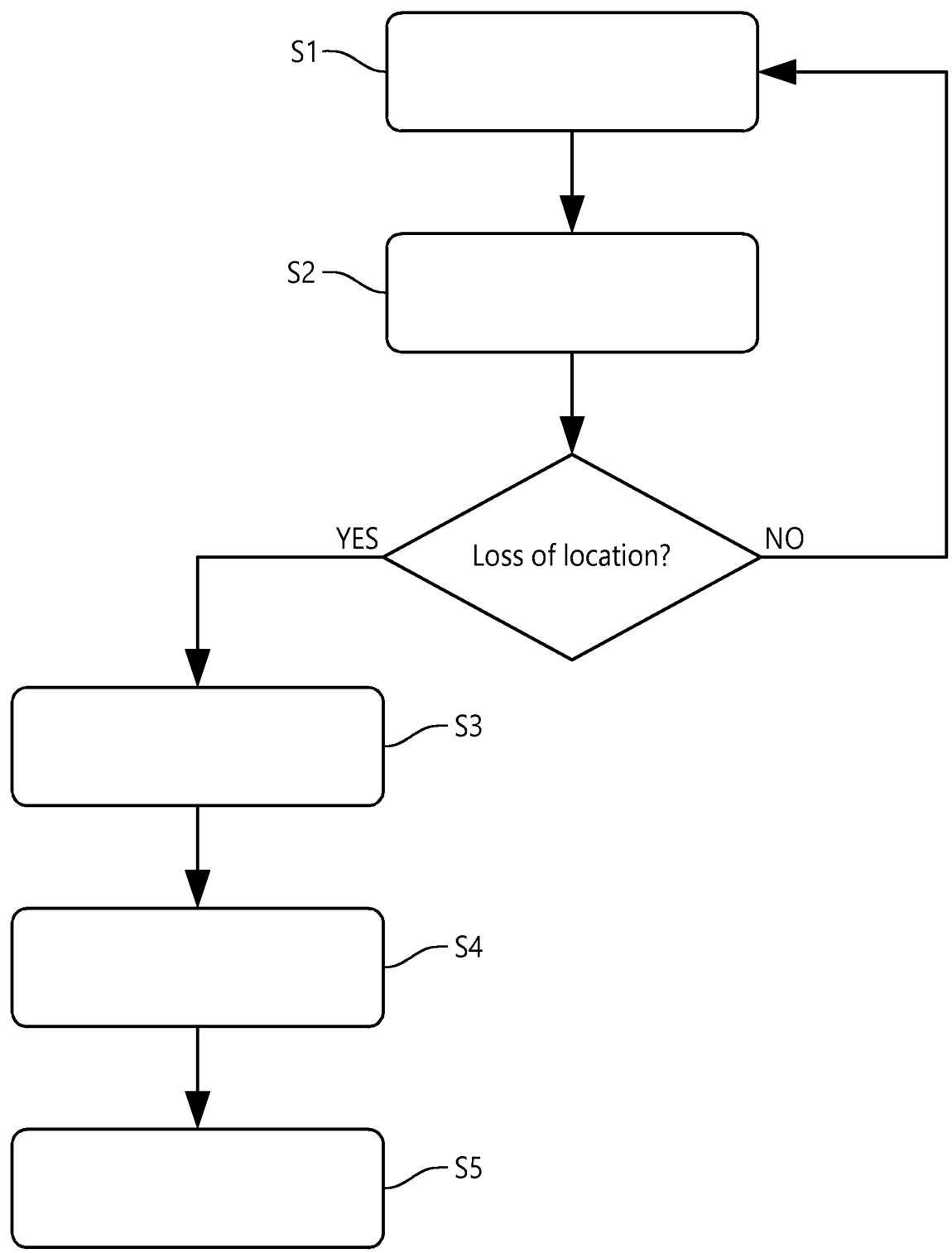
FIG. 3 is a flow chart of a method for controlling a driving operation of an autonomously controlled vehicle according to an example embodiment.

In order to describe a driving operation when the map data signal is lost, i.e. the scenario when a loss of location is determined, reference is made to FIG. 2 in combination with FIG. 3.

At first, and as described above, the control system 105 is configured obtain S1 a signal indicative of the road path 200 to the end destination 300. The road path 200 for the vehicle 100 to follow can be received from the above described GPS, although other alternatives are conceivable, such as stored map data obtained by the control system 105. When the system knows the road path 200 to follow, the plurality of stop positions 10, 20, 30 are generated S2. The number of stop positions along the road path can be dependent on the distance to the end destination 300, the traffic situation along the road path 200, etc.

The control system 105 determines if a loss of location 150 of the vehicle has occurred. The loss of location 150 is in FIG. 2 illustrated such that the GPS fails to receive map data from the satellite 400, i.e. the communication between the GPS and the satellite 400 is suddenly lost. The reason for losing location of the vehicle can be of different type, such that the vehicle is driving in a tunnel, or at an area where the strength of the communication signal between the GPS and the satellite for other reasons is pore. If no loss of location 150 is determined, the procedure returns to the first step of obtaining S1 an updated signal indicative of the road path, or returns to the second step, whereby the control system 105 updates the generation S2 of stop positions.

When the control system 105 determines a loss of location 150 of the vehicle 100, the control system 105 determines S3 the position 15 along the road path 200 at which the loss of location occurred, i.e. the last "known" position of the vehicle along the road path 200. Hereby, the control system 105 is able to set a starting position for further action.

The navigation system 110 is thereafter controlled S4 to navigate the vehicle 100 from the current position, i.e. the position of loss of location 150, to the first stop position 10 along the road path. In particular, the navigation system 110 is controlled using angular velocity data of the sensor 120 to navigate the vehicle 100 to the first stop position 10. Preferably, the navigation system 110 is configured to operate the vehicle in a so-called limp-home mode when driving towards the first stop position 10, i.e. driving relatively slow, reduction of operational capacity of driveline components, etc. As an option, controlling the navigation system 110 using the sensor 120 may be performed by means of a-called path follower. When the sensor is a yaw rate sensor, the path/speed profile in space can be translated to an equivalent yaw rate over distance/time, whereby the yaw rate from the road path is used for controlling the yaw rate of the sensor. When the sensor 120 is a wheel speed sensor, the navigation can be controlled in such a way that the wheel speeds of the left- and right wheels are merged to obtain the yaw rate of the road path.

When the vehicle 100 has arrived at the first stop position 10, the vehicle is controlled S5 in a stand-still operation. Hence, the vehicle is controlled to stop, i.e. the wheels of the vehicle 100 do not rotate. When the vehicle 100 is arranged in the stand-still operation, the sensor 120 is calibrated. The calibration may be executed by obtaining an offset angular velocity of the sensor, which corresponds to an obtained angular velocity of the sensor when the vehicle is arranged in the stand-still operation. When calibrating the sensor 120, the offset angular velocity is subtracted from an obtained angular velocity.

Accordingly, when the vehicle departs from the first stop position 10, it is assured that the sensor is sufficiently calibrated for further operation. The navigation system is thereafter controlled, using the angular velocity data from the sensor, to autonomously operate the vehicle towards the second stop position 20. At the second stop position 20, the vehicle 100 is once again controlled to a stand-still operation, whereby the sensor is calibrated. The procedure thereafter continues to the remaining plurality of stop positions 30 until the vehicle 100 arrives at the end destination, or until determining that the location of the vehicle 100 is restored, i.e. the GPS receives a signal from the satellite 400 such that the orientation of the vehicle 100 along the road path can be determined.

As an option, the vehicle 100 may be controlled to be arranged in the stand-still operation immediately when the loss of location is determined. Hereby, an initial calibration of the sensor 120 can be performed before the vehicle 100 is operated towards the first stop position 10. Also, the vehicle 100 may be controlled to be arranged in an intermediate stand-still operation between two planned stop positions 10, 20 when a signal is received which indicates a too severe angular velocity of the sensor, i.e. the obtained angular velocity exceeds a predetermined threshold limit, and it can be assumed that the angular velocity data received from the sensor is not sufficiently accurate.

The control system is thus arranged as a so-called dead reckoning system, which comprises the process of calculating current position of the vehicle 100 by using a previously determined position, or fix, by using estimations of speed, heading direction and course over elapsed time.

As a still further option, the control system 105 may be configured to control the navigation system 110 to continue navigation of the vehicle from the first stop position once receiving a verification signal that such start-up and navigation should be performed. The signal may preferably be received once the sensor is sufficiently calibrated. The verification signal may also be received from an operator occupying the passenger compartment. The operator thus can make sure that safe continued operation of the vehicle 100, with regards to e.g. surrounding traffic conditions, can be performed. The verification signal may optionally be received from a central control tower system, etc.

The control system 105 may also, as an alternative, generate the upcoming stop positions based on the calibration at the first stop position 10. In particular, the control system 105 may determine that the drift of the sensor was not as severe as expected and that calibration can therefore be executed less frequently. The control system 105 can thus generate upcoming stop positions with increased distance from each other.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling a driving operation of an autonomously controlled vehicle, the vehicle comprising a sensor arranged to measure an angular velocity of the vehicle in at least one direction during operation, the method comprising:
    obtaining a signal indicative of a road path to an end destination for operation of the vehicle;
    generating a plurality of stop positions along the road path; and when determining a loss of location of the vehicle:
        determining a position along the road path at the loss of vehicle location;
        controlling a navigation system of the vehicle, using angular velocity data from the sensor, to autonomously operate the vehicle in a direction from the position of loss of location to a first upcoming stop position of the plurality of stop positions;
        controlling the vehicle to a stand-still operation when the vehicle arrives at the stop position for calibration of the sensor;
        controlling the navigation system to autonomously operate the vehicle to the remaining stop positions; and
        controlling the vehicle to the stand-still operation and calibrate the sensor at each of the remaining stop positions.

2. The method according to claim 1, further comprising:
    controlling the vehicle to the stand-still operation for calibration of the sensor when determining the loss of location.

3. The method according to claim 1, further comprising:
    obtaining a signal indicative of an angular velocity of the sensor, and
    controlling the vehicle to an intermediate stand-still operation when the angular velocity exceeds a predetermined threshold limit.

4. The method according to claim 1, wherein the number of plurality of stop positions is dependent on the length of the road path to the end destination.

5. The method according to claim 1, wherein calibration of the sensor comprises:

obtaining a signal indicative of a value of the angular velocity of the sensor when the vehicle is arranged in the stand-still operation;
setting the value as an offset angular velocity; and
calibrating the sensor by subtracting the offset angular velocity from the obtained angular velocity value.

6. The method according to claim 1, wherein the navigation system is arranged in a limp-home mode when determining the loss of location of the vehicle.

7. The method according to claim 1, wherein the position along the road path at the loss of vehicle location is received from a positioning system of the vehicle.

8. The method according to claim 7, wherein the positioning system is at least one of a GPS, a GNSS or a LIDAR system.

9. The method according to claim 1, wherein the navigation system is configured to receive the road path to the end destination comprising the plurality of stop positions in the form of offline available data prior to vehicle departure.

10. The method according to claim 1, wherein sensor data from the sensor is used in the navigation system of the vehicle, to autonomously operate the vehicle in a direction from the position of loss of location to an upcoming stop position.

11. The method according to claim 1, wherein the sensor is a yaw rate sensor configured to measure a yaw angular velocity during vehicle operation.

12. The method according to claim 1, wherein the sensor is a wheel speed sensor configured to measure a wheel angular velocity during vehicle operation.

13. The method according to claim 1, further comprising:
obtaining a verification signal indicative of a completed sensor calibration; and
controlling the navigation system of the vehicle to, using angular velocity data from the sensor, autonomously operate the vehicle in a direction towards an upcoming stop position.

14. A control system for autonomously controlling a vehicle, the control system being connectable to a navigation system and to a sensor arranged to measure an angular velocity of the vehicle in at least one direction during operation, wherein the control system is configured to:

obtain a signal indicative of a road path to an end destination for operation of the vehicle;
generate a plurality of stop positions along the road path; and when the control system determines a loss of location of the vehicle;
determine a position along the road path at the loss of vehicle location;
transmit a navigation signal to the navigation system of the vehicle, the navigation signal being arranged to, when executed by the navigation system, cause the navigation system to autonomously operate the vehicle, using angular velocity data from the sensor, in a direction from the position of loss of location to a first upcoming stop position of the plurality of stop positions and to arrange the vehicle in a stand-still operation when the vehicle arrives at the stop position;
transmit a calibration signal to the sensor, the calibration signal being arranged to, when executed by the sensor, calibrate the sensor when the vehicle is arranged in the stand-still operation;
transmit a navigation signal to the navigation system of the vehicle, the navigation signal being arranged to, when executed by the navigation system, cause the navigation system to autonomously operate the vehicle, using angular velocity data from the sensor, to the remaining stop positions and to arrange the vehicle in a stand-still operation when the vehicle arrives at each of the remaining stop positions; and
transmit a calibration signal to the sensor, the calibration signal being arranged to, when executed by the sensor, calibrate the sensor when the vehicle is arranged in the stand still operation at each of the remaining in the stand-still operation.

15. The autonomously controlled vehicle, comprising the navigation system, a sensor arranged to measure the angular velocity of the vehicle in at least one direction during operation, and the control system according to claim 14, wherein the control system is connected to the navigation system and the sensor for communication of control signals therebetween.

* * * * *